(12) United States Patent
Chen et al.

(10) Patent No.: US 8,856,194 B2
(45) Date of Patent: Oct. 7, 2014

(54) EFFICIENT GARBAGE COLLECTION IN VIRTUALIZATION ENVIRONMENT

(75) Inventors: Ying Chen, Beijing (CN); Li Li, Beijing (CN); Liang Liu, Beijing (CN); Rui Xiong Tian, Beijing (CN); Hao Wong, Beijing (CN); Qing Bo Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 13/088,475

(22) Filed: Apr. 18, 2011

(65) Prior Publication Data

US 2011/0270899 A1 Nov. 3, 2011

(30) Foreign Application Priority Data

Apr. 29, 2010 (CN) .......................... 2010 1 0161755

(51) Int. Cl.
*G06F 9/455* (2006.01)
*G06F 12/02* (2006.01)
(52) U.S. Cl.
CPC ........ *G06F 12/0253* (2013.01); *G06F 9/45558* (2013.01); *G06F 2009/45583* (2013.01)
USPC ....................................................... 707/816
(58) Field of Classification Search
USPC ....................................................... 707/816
See application file for complete search history.

(56) References Cited

U.S. PATENT DOCUMENTS

| | | | |
|---|---|---|---|
| 4,797,810 A | 1/1989 | Mcentee et al. | |
| 4,907,151 A | 3/1990 | Bartlett | |
| 6,567,905 B2 | 5/2003 | Otis | |
| 6,763,440 B1 | 7/2004 | Traversat et al. | |
| 6,836,782 B1 | 12/2004 | Fresko et al. | |
| 6,886,085 B1 | 4/2005 | Shuf et al. | |
| 6,912,553 B1 | 6/2005 | Kolodner et al. | |
| 7,529,786 B2 | 5/2009 | Andreasson | |
| 7,996,446 B2 | 8/2011 | Bacon et al. | |
| 2002/0099765 A1 | 7/2002 | Otis | |
| 2007/0016633 A1 | 1/2007 | Lindholm et al. | |
| 2009/0070776 A1 | 3/2009 | Dahlstedt | |
| 2009/0300086 A1 | 12/2009 | Bacon | |
| 2010/0011357 A1 | 1/2010 | Ramamurthy | |

FOREIGN PATENT DOCUMENTS

CN 101493787 A 7/2009

OTHER PUBLICATIONS

Sun Microsystems, "Memory Management in the JAVA HOTSPOT™ Virtual Machine," Apr. 2006. Available at: URL:http://java.sun.com/j2se/reference/whitepapers/memorymanagement_whitepaper.pdf.

Goh, et al., "Integrated scheduling with garbage collection for real-time embedded applications in OLI," IEEE 9th International Symposium on Object and Component-Oriented Real-Time Distributed Computing, 2006, ISORC 2006, Apr. 24-26, 2006.

*Primary Examiner* — Amresh Singh
(74) *Attorney, Agent, or Firm* — Arnold Banaali; Vazken Alexenian (57) ABSTRACT

A method and system for garbage collection in a virtualization environment. The virtualization environment includes a virtual machine hypervisor, at least one guest operating system, and at least one application program that runs on each guest operating system. The application program performs memory management using a garbage collection mechanism. The method includes, in response to an operating environment of the application program initiating garbage collection, the garbage collector requesting the guest operating system to assign a memory space and in response, the guest operating system assigns the memory space to the garbage collector. Then garbage collector marks live objects in an original memory space of the application program, and replicates the marked live objects to the assigned memory space. Finally, the garbage collector releases the original memory space of the application program to the guest operating system.

7 Claims, 12 Drawing Sheets

| MEMORY ASSIGNMENT OF GUEST OPERATING SYSTEM 1 | PAGING | PHYSICAL ADDRESS |
|---|---|---|
| APPLICATION PROGRAM 1 | Page 1 | 3E8000 |
| | Page 2 | 3E9000 |
| | Page 3 | 3EA000 |
| KERNEL OF GUEST OPERATING SYSTEM 1 AND OTHER APPLICATION PROGRAM | Page 1 | 7D0000 |
| | Page 2 | 7D1000 |
| | Page 3 | 7D2000 |
| | Page 4 | 8D0000 |
| | Page 5 | 8D1000 |
| | Page 6 | 8D2000 |
| | ...... | ...... |

FIG. 4

| MEMORY ASSIGNMENT OF GUEST OPERATING SYSTEM 1 | PAGING | PHYSICAL ADDRESS |
|---|---|---|
| APPLICATION PROGRAM 1 | Page 1 | 3E8000 |
| | Page 2 | 3E9000 |
| | Page 3 | 3EA000 |
| | Page 4 | 7D0000 |
| | Page 5 | 7D1000 |
| | Page 6 | 7D2000 |
| KERNEL OF GUEST OPERATING SYSTEM 1 AND OTHER APPLICATION PROGRAM | Page 1 | 8D0000 |
| | Page 2 | 8D1000 |
| | Page 3 | 8D2000 |
| | ...... | ...... |

FIG. 5

| MEMORY ASSIGNMENT OF GUEST OPERATING SYSTEM 1 | PAGING | PHYSICAL ADDRESS |
|---|---|---|
| APPLICATION PROGRAM 1 | Page 1 | 7D0000 |
| | Page 2 | 7D1000 |
| | Page 3 | 7D2000 |
| KERNEL OF GUEST OPERATING SYSTEM 1 AND OTHER APPLICATION PROGRAM | Page 1 | 3E8000 |
| | Page 2 | 3E9000 |
| | Page 3 | 3EA000 |
| | Page 4 | 8D0000 |
| | Page 5 | 8D1000 |
| | Page 6 | 8D2000 |
| | …… | …… |

FIG. 6

| MEMORY ASSIGNMENT OF GUEST OPERATING SYSTEM 1 | PAGING | PHYSICAL ADDRESS |
|---|---|---|
| APPLICATION PROGRAM 1 | Page 1 | 3E8000 |
| | Page 2 | 3E9000 |
| | Page 3 | 3EA000 |
| DYNAMIC MEMORY HYPERVISOR | Page 1 | 900000 |
| | Page 2 | 901000 |
| | Page 3 | 902000 |
| | Page 4 | 903000 |
| | ……… | ………… |
| KERNEL OF GUEST OPERATING SYSTEM 1 AND OTHER APPLICATION PROGRAM | Page 1 | 800000 |
| | Page 2 | 801000 |
| | Page 3 | 802000 |
| | ……… | ………… |

FIG. 7

| MEMORY ASSIGNMENT OF VIRTUAL MACHINE HYPERVISOR | PAGING | MACHINE ADDRESS | NOTES(CORRESPONDING PHYSICAL ADDRESS IN GUEST OPERATING SYSTEM) |
|---|---|---|---|
| GUEST OPERATING SYSTEM 1 | Page n1 | 9700000 | 3E8000 |
| | Page n2 | 9701000 | 3E9000 |
| | Page n3 | 9702000 | 3EA000 |
| | Page n4 | 9B18000 | 800000 |
| | Page n5 | 9B19000 | 801000 |
| | Page n6 | 9B1A000 | 802000 |
| | ... | ... | |
| GUEST OPERATING SYSTEM 2 | .... | ... | |

FIG. 8

| MEMORY ASSIGNMENT OF GUEST OPERATING SYSTEM 1 | PAGING | PHYSICAL ADDRESS |
|---|---|---|
| APPLICATION PROGRAM 1 | Page 1 | 3E8000 |
| | Page 2 | 3E9000 |
| | Page 3 | 3EA000 |
| | Page 4 | 900000 |
| | Page 5 | 901000 |
| | Page 6 | 902000 |
| DYNAMIC MEMORY HYPERVISOR | Page 1 | 903000 |
| | ......... | ............ |
| KERNEL OF GUEST OPERATING SYSTEM AND OTHER APPLICATION PROGRAM | Page 1 | 800000 |
| | Page 2 | 801000 |
| | Page 3 | 802000 |
| | ......... | ............ |

FIG. 9

| MEMORY ASSIGNMENT OF VIRTUAL MACHINE HYPERVISOR | PAGING | MACHINE ADDRESS | NOTES(CORRESPONDING PHYSICAL ADDRESS IN GUEST OPERATING SYSTEM) |
|---|---|---|---|
| GUEST OPERATING SYSTEM 1 | Page n1 | 9700000 | 3E8000 |
| | Page n2 | 9701000 | 3E9000 |
| | Page n3 | 9702000 | 3EA000 |
| | Page n4 | 9B18000 | 800000 |
| | Page n5 | 9B19000 | 801000 |
| | Page n6 | 9B1A000 | 802000 |
| | Page n7 | 9C18000 | 900000 |
| | Page n9 | 9C19000 | 901000 |
| | Page n10 | 9C1A000 | 902000 |
| | ... | ... | |
| GUEST OPERATING SYSTEM 2 | .... | ... | |

FIG. 10

| MEMORY ASSIGNMENT OF GUEST OPERATING SYSTEM 1 | PAGING | PHYSICAL ADDRESS |
|---|---|---|
| APPLICATION PROGRAM 1 | Page 1 | 900000 |
| | Page 2 | 901000 |
| | Page 3 | 902000 |
| DYNAMIC MEMORY HYPERVISOR | Page 1 | 3E8000 |
| | Page 2 | 3E9000 |
| | Page 3 | 3EA000 |
| | Page 4 | 903000 |
| | ......... | ............ |
| KERNEL OF GUEST OPERATING SYSTEM AND OTHER APPLICATION PROGRAM | Page 1 | 800000 |
| | Page 2 | 801000 |
| | Page 3 | 802000 |
| | ......... | ............ |

FIG. 11

| MEMORY ASSIGNMENT OF VIRTUAL MACHINE HYPERVISOR | PAGING | MACHINE ADDRESS | NOTES(CORRESPONDING PHYSICAL ADDRESS IN GUEST OPERATING SYSTEM) |
|---|---|---|---|
| GUEST OPERATING SYSTEM 1 | ... | ... | |
| | Page n4 | 9B18000 | 800000 |
| | Page n5 | 9B19000 | 801000 |
| | Page n6 | 9B1A000 | 802000 |
| | Page n7 | 9C18000 | 900000 |
| | Page n9 | 9C19000 | 901000 |
| | Page n10 | 9C1A000 | 902000 |
| | ... | ... | |
| GUEST OPERATING SYSTEM 2 | .... | ... | |

EFFICIENT GARBAGE COLLECTION IN VIRTUALIZATION ENVIRONMENT

CROSS-REFERENCE TO RELATED APPLICATIONS

This application claims priority under 35 U.S.C. §119 to Chinese Patent Application No. 201010161755.1 filed on Apr. 29, 2010, the entire contents of which are incorporated herein by reference.

BACKGROUND OF THE INVENTION

1. Field of the Invention

The present invention relates to garbage collection in a virtualized environment, and more specifically, to a method and system for garbage collection in which extra memory is allocated and merged into program space.

2. Description of Related Art

Currently, the virtualization technology has been widely applied. The virtualization technology provides a mode that can accommodate a plurality of virtual machines (VM) in a large server, which reduces the overall cost for the user and improves the reliability and flexibility of the application, thereby reducing the possibility that the user excessively provides computing resources for some workload spikes. The virtualization technology helps to isolate important applications, whereby different applications operating on different virtual machines will not share the operating system. Accordingly, a fatal breakdown caused by applications will not influence the application in other virtual machines. The virtualization technology is an important and basic technology in "Cloud Computing" technology. Around the world, more and more individuals and organizations are using virtualization solution to provide "Cloud Environment" service so as to obtain the benefits of improving the utilization efficiency and flexibility of computer hardware, and reducing the hardware cost.

Garbage collection is a memory management mechanism that the program executing environment (such as java, C# and most of the scripting languages) automatically collects the unused memory. A garbage collector is an important composite part of the virtual machine. Take JVM (Java Virtual Machine) as an example, when there is too small free memory space managed by the JVM or too small continuous free memory space, and the JVM cannot assign a memory space for an object from the Heap, the JVM will issue a message indicating a wrong memory assignment, thereby activating the garbage collector to perform garbage collection. When the garbage collector performs garbage collection, it checks objects that are no longer used by the application program in the heap and performs a necessary operation to collect the memory occupied by them. The garbage collection tactics generally include a mark-copy method and a mark-sweep method. In the mark-copy method, the Java virtual machine divides the managed memory space into two parts. When half of one part of memory space is used, the garbage collection process will copy all live objects to the other half of unused memory space, and continue to assign the memory on the other half space. The former half of the space converts into free space as a target space for the next garbage collection. However, the mark-copy method requires that a half of the memory space managed by the virtual machine must be saved which means the memory usage rate will not exceed 50%. In the mark-sweep method, the operating process can be divided into three phases: marking phase, sweeping phase, and compressing phase. The task of the marking phase is traversing all the directed objects from a root node of the objects, and adding a mark to all the live objects being found until the traversing is completed. Objects which are not marked are garbage. All the garbage is collected in the sweeping phase. Finally, in the compressing phase, the objects distributed discretely and disorderly are placed in a continuous address in the memory. Although the compressing phase is not initiated in each garbage collection, the time consumed in one compressing phase is usually several seconds. During this period, the application execution stops. Since the application of a server terminal is widely operated on the virtual machine, a cloud computing platform as a server terminal needs to process a large amount of application requests and needs to ensure the service quality. The service quality of the server terminal application requires the response time for processing the requests to be in a millisecond order. Therefore, the response delay introduced by the virtual machine in the compressing phase in the garbage collection is unacceptable, and should be avoided.

Since the response delay increase caused by the mark-sweep method is unacceptable, and a traditional mark-copy method causes a too low memory utilization rate (no more than 50%), and the memory in the virtualized platform is a key valuable resource, a garbage collection method that improves the memory usage efficiency in a virtualization environment is needed to meet the requirement of the long time operating program at the server terminal on the response time of the service request.

SUMMARY OF THE INVENTION

According to a first aspect, the present invention provides a method of garbage collection in a virtualization environment, the virtualization environment including a virtual machine hypervisor, at least one guest operating system and at least one application program that runs on the guest operating system, wherein the application program performs memory management using a garbage collection mechanism, the method including: in response to an operating environment of the application program initiating garbage collection, requesting the guest operating system to assign a memory space for the application program; in response to the guest operating system assigning the memory space for the application program, marking live objects in an original memory space of the application program; replicating the marked live objects to the assigned memory space; and releasing the original memory space of the application program to the guest operating system.

According to a second, the present invention provides a system for garbage collection in a virtualization environment, the virtualization environment including a virtual machine hypervisor, at least one guest operating system and at least one application program that runs on the guest operating system, wherein the application program performs memory management using the garbage collection mechanism, the system including: a memory space requesting module configured to request the guest operating system to assign a memory space for the application program, in response to an operating environment of the application program initiating garbage collection; a marking module configured to mark live objects in an original memory space of the application program, in response to the guest operating system assigning the memory space for the application program; a replicating module configured to replicate the marked live objects to the assigned memory space; and a memory space releasing module configured to release the original memory space of the application program to the guest operating system.

According to the method and system for garbage collection in a virtualization environment, the guest operating system is requested to assign a memory space to perform garbage collection when garbage collection is initiated to perform memory management. After the guest operating system collects the memory space released by the garbage collector, the memory space can continue to be assigned and used by an operating system kernel and all the application programs operating thereon such that the memory usage rate is improved.

Other characteristics and advantages of the invention will become obvious in combination with the description of accompanying drawings, wherein the same number represents the same or similar parts in all figures

BRIEF DESCRIPTION OF THE DRAWINGS

The present invention per se, the preferred embodiments and an object and advantages of the present invention can be better understood with reference to the drawings and the following detailed descriptions of the illustrative embodiments, wherein.

DETAILED DESCRIPTION OF THE PREFERRED EMBODIMENT

The basic principle of the invention is a method and system for garbage collection in a virtualization environment. A detailed description of the invention is made in combination with the following embodiments.

Figure 1:
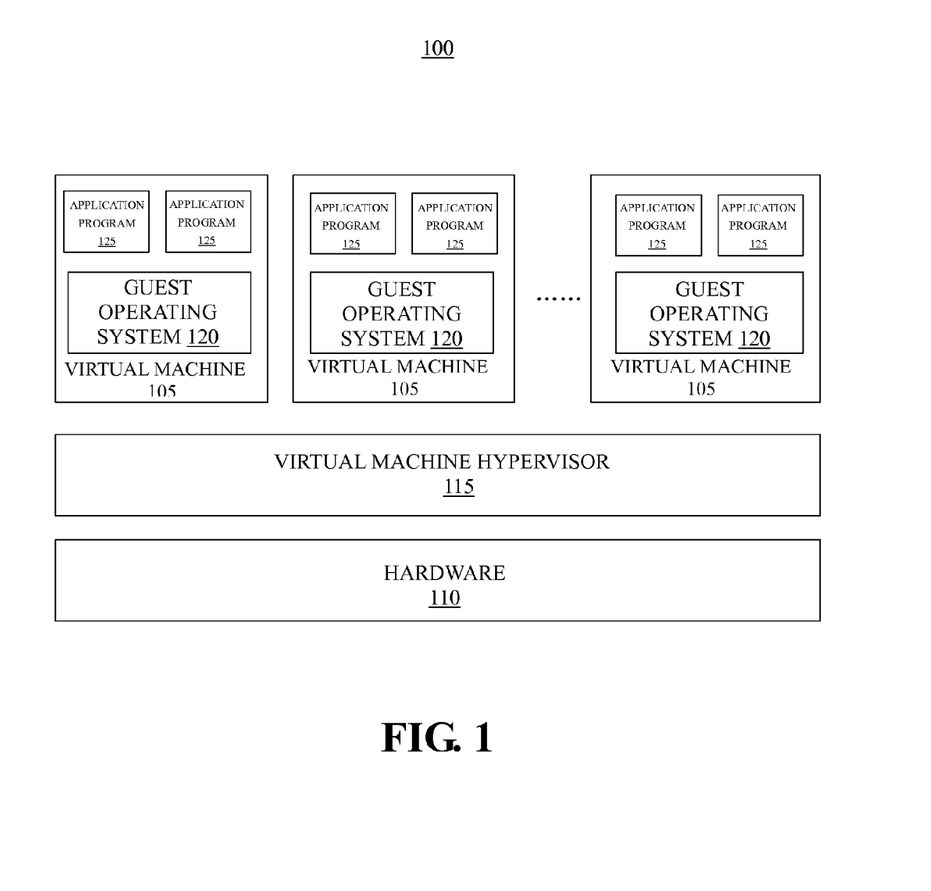
FIG. 1 illustrates a schematic diagram of a virtualization environment framework in which a plurality of virtual machines are deployed on a same physical machine according to one embodiment of the present invention.

FIG. 1 illustrates a schematic diagram of a virtualization environment framework 100 in which a plurality of virtual machines 105 is deployed on a same physical machine 110 according to one embodiment of the present invention. The virtualization environment 105 includes a physical machine 110, a virtual machine hypervisor 115 and a plurality of virtual machines 105, wherein the virtual machine is a strictly isolated software container which includes a plurality of guest operating systems (guest OS) 120 and a plurality of application programs 125 that run on each guest operating system 120. A plurality of virtual machines 105 that can have different operating systems run independently and in parallel on a same physical machine 110, thereby resource sharing of a single physical machine is realized among a plurality of virtual machines. The virtual machine hypervisor 115 is a software layer that provides bottom machine virtualization, which runs on physical hardware 110, realizes management and support of the virtual machine on the bottom layer, and assigns hardware resources to the virtual machine in a dynamic and transparent mode. The embodiments of the present invention can either run in a Java virtual machine (JVM) operating environment defined by Java standard specification, or any type of virtual machine that is independent of a platform, such as C#, Smalltalk, Ruby, D language and nuva, which are not limited to the Java virtual machine.

Figure 2:
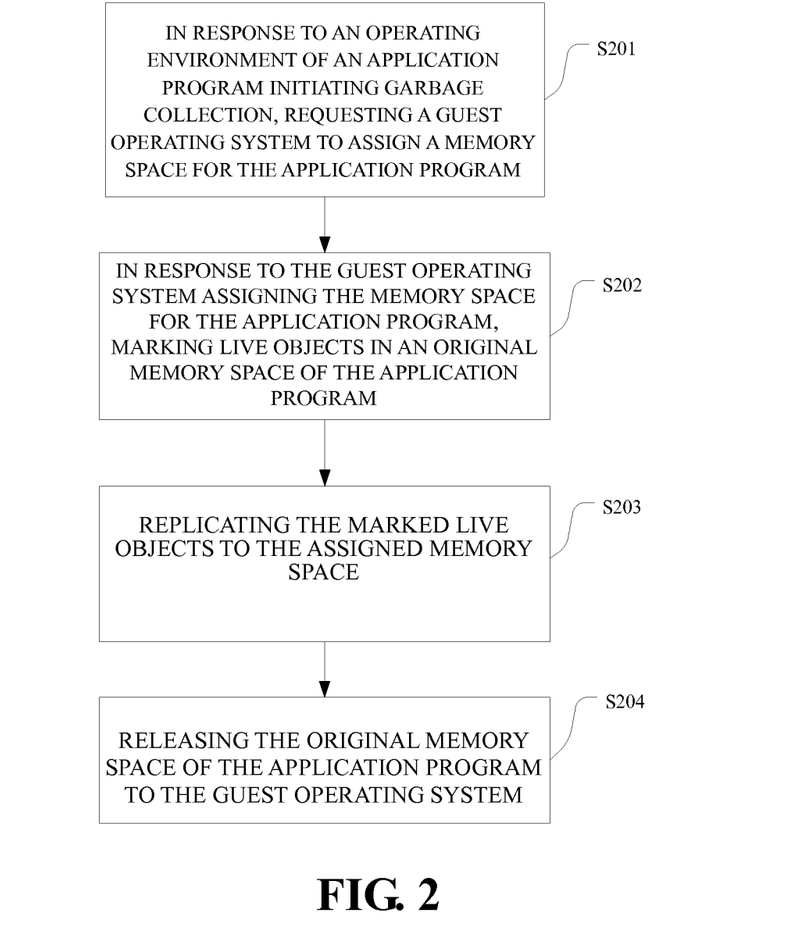
FIG. 2 illustrates a method of garbage collection in a virtualization environment according to one embodiment of the present invention.

FIG. 2 illustrates a method of garbage collection in a virtualization environment according to one embodiment of the present invention. The virtualization environment includes a virtual machine hypervisor, at least one guest operating system and at least one application program that runs on each guest operating system. The application program performs memory management using a garbage collection mechanism.

The method includes the following steps: in step S201, in response to an operating environment of the application program initiating garbage collection, requesting the guest operating system to assign a memory space for the application program; in step S202, in response to the guest operating system assigning the memory space for the application program, marking the live objects in an original memory space of the application program; in step S203, replicating the marked live objects to the assigned memory space; and in step S204, releasing the original memory space of the application program to the guest operating system.

In step S201, in response to the operating environment of the application program initiating the garbage collection, the guest operating system is requested to assign a memory space for the application program. More specifically, take JVM (Java Virtual Machine) as an example, when there is too few free memory space managed by JVM or too few continuous free memory space, the JVM cannot assign a memory space for an object from the Heap, consequently, a wrong memory assignment is caused, whereby the garbage collector is activated to perform garbage collection, and the guest operating system is requested to assign a memory space for garbage collection. According to the embodiments of the present invention, requesting the guest operating system to assign a memory space for the application program can either be realized by a garbage collector or an operating environment of the application program.

In step S202, in response to the guest operating system assigning the memory space to the application program, the live objects are marked in an original memory space of the application program. More specifically, the guest operating system of the virtual machine is in charge of assigning memory for a plurality of application programs operating thereon, such as the heap memory for variable storage of the members, and the stack memory for partial variable storage, which are both provided by the operating system (e.g. Windows, and Linux, etc.).

Generally, the memory management in a virtualization environment requires maintaining a mapping relationship of three address spaces: an address space of an application program, an address space of a guest operating system and an address space of a virtual machine hypervisor. The address space of the application program, the address space of the guest operating system and the address space of the virtual machine hypervisor should all be continuous, i.e., started from 0. However, the space assigned for a requester by the virtual machine hypervisor and the guest operating system can be discontinuous. The guest operating system and virtual machine hypervisor maintain the above mapping relationship through a page table. Marking can be performed using the methods for marking live objects in the existing garbage collection methods, which will not be redundantly described here.

Figure 3:
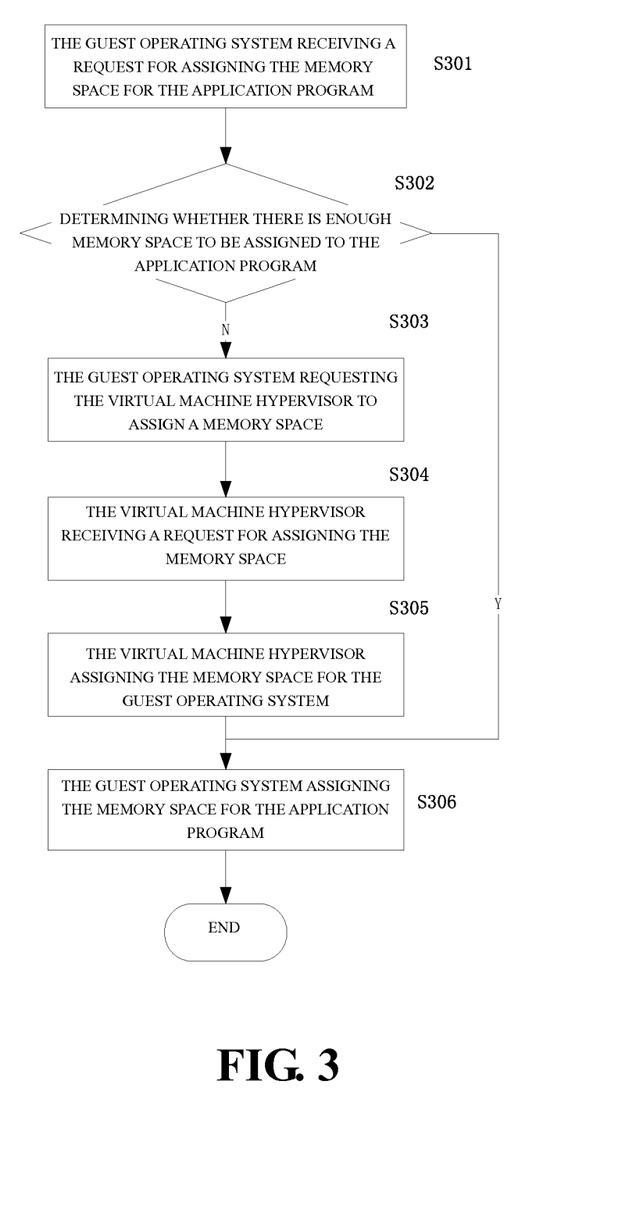
FIG. 3 illustrates a flow chart of implementation method of the guest operating system assigning a memory space to the application program according to one embodiment of the present invention.

FIG. 3 illustrates a flow chart of implementation method of the guest operating system assigning a memory space to the application program according to one embodiment of the present invention. As shown in the figure, in step S301, the guest operating system receives a request for assigning a memory space for an application program. The guest operating system determines whether there is enough memory space to be assigned to the application program in step S302. If the determination result is positive, the guest operating system will assign a memory space for the application program in step S306. If the determination result is negative, the guest operating system will request the virtual machine hypervisor to assign a memory space in step S303. According to the embodiments of the present invention, a dynamic memory hypervisor module is added in the guest operating system for requesting the virtual machine hypervisor to assign a memory or to release a memory.

When the guest operating system is initiated, the dynamic memory hypervisor will occupy a segment of memory space of the guest operating system, and the virtual machine hypervisor will not assign an actual physical space for the memory space occupied by the dynamic memory hypervisor.

The memory used by the garbage collector is always assigned and collected by the dynamic memory hypervisor. The process that the garbage collector requests the operating system to assign and release a memory is actually a process for requesting and assigning a memory to a dynamic memory assigner. In step S304, the virtual machine hypervisor receives a request of the guest operating system for assigning a memory space. In a specific implementation solution, the virtual machine hypervisor checks whether the free memory can meet the need. If it cannot meet the need, a traditional garbage collection method such as a mark-sweep method will be called for garbage collection. Since it is merely a beneficial supplement to the implementation solution of the present invention, which does not relate to the inventive point of the present invention, the description of the step is omitted. In step S305, the virtual machine hypervisor assigns a memory space for the guest operating system. Next, proceed to step S306, the guest operating system assigns a memory space for the application program. Finally, the process comes to the end.

In step S203, the marked live objects are replicated to the assigned memory space. The replicating is performed using a memory space newly assigned by the guest operating system to finish garbage collection. According to a memory assigning method of one embodiment of the present invention, it avoids the problem that the existing mark-copy method must save half of the managed memory space to be used as a memory space of object copy in garbage collection, but requests the guest operating system to assign a memory space for garbage collection, which thus improves the memory usage rate to approach to 100%.

In step S204, the original memory space of the application program is released to the guest operating system. If the assigned space is directly from the memory space of the guest operating system itself, after the guest operating system collects the memory space released by the garbage collector, the memory space can be assigned and used by the operating system kernel and all application programs operating thereon. If the assigned memory space is from the memory space of the virtual machine hypervisor, after the virtual machine hypervisor collects the memory space released by the guest operating system, the memory space can be assigned and used by all guest operating systems operating thereon, which greatly improves the usage rate of the memory.

Next, the process for guest operating system 1 assigning a memory space for the garbage collector is described according to one embodiment of the present invention. The guest operating system manages memory assignment through maintaining a page table. The page table maintained by the guest operating system is a corresponding table of a physical address at which a plurality of memory pages assigned to the operating system kernel and the application programs are located. The physical address here is an address seen by the virtual machine rather than a real machine address.

Figure 4:
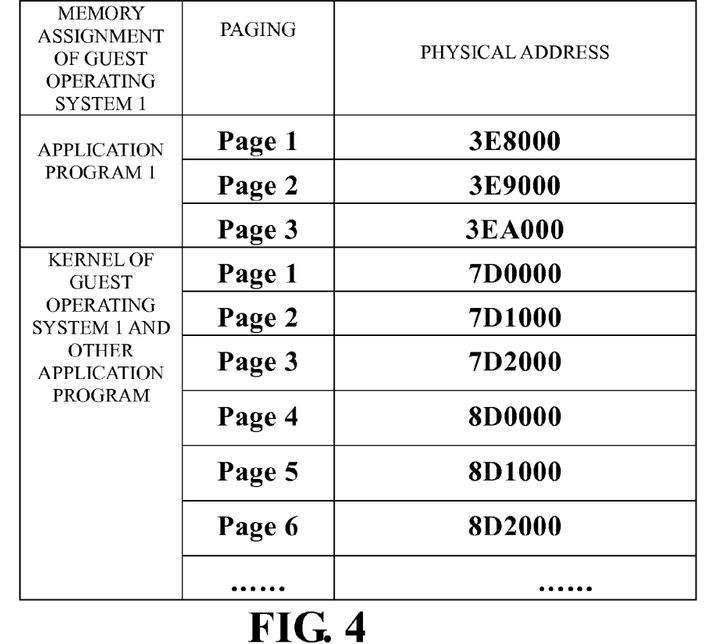
FIG. 4 illustrates a page table that the guest operating system 1 maintains a memory space according to one embodiment of the present invention.

FIG. 4 illustrates a page table that the guest operating system 1 maintains a memory space according to one embodiment of the present invention. For the convenience of description, a page size is illustratively set to 4 k.

The application program 1 uses a memory of 12 k (three pages). The process for the guest operating system 1 assigning a memory space to the garbage collector is as follows: the garbage collector issues a system call: gc_dmem_allocate (size), requesting the guest operating system 1 to assign a memory space; after receiving the request, the guest operating system 1 checks whether the free memory can meet the need; the guest operating system 1 assigns a memory of 12 k to the application program 1, the guest operating system 1 correspondingly updates a page table at this time.

Figure 5:
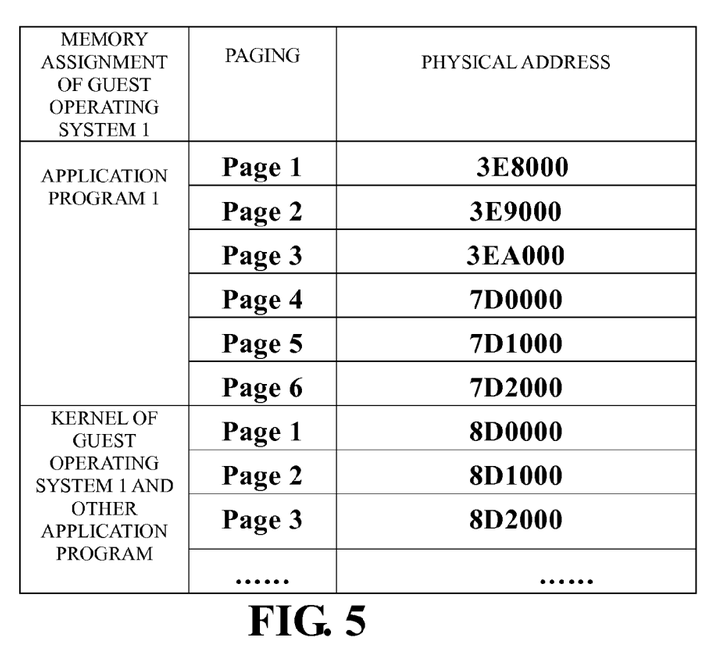
FIG. 5 illustrates an updated page table after the operating system 1 assigning a memory space to the application program according to one embodiment of the present invention.

FIG. 5 illustrates an updated page table after the operating system 1 assigning a memory space to garbage collector according to one embodiment of the present invention. As shown in the page table, the memory space of the application program 1 is increased by 12 k (three pages), and the memory pages of the operating system kernel and other application programs is reduced by 12 k (three pages). Thereafter, the garbage collector marks live objects in an original memory space of the application program 1 using a Mark-Copy method and replicates the marked live objects to the newly assigned memory space.

Finally, the garbage collector releases the original memory space of the application program 1 to the guest operating system 1, and the guest operating system 1 correspondingly updates the page table.

Figure 6:
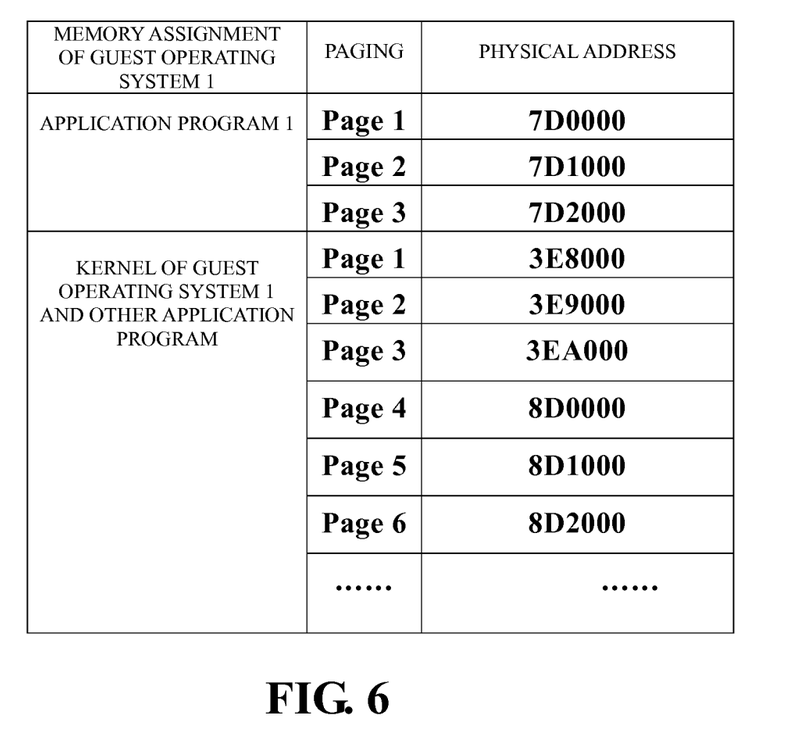
FIG. 6 illustrates an updated page table after the operating system 1 collecting an original memory space of an application program 1 according to one embodiment of the present invention.

FIG. 6 illustrates an updated page table after the operating system 1 collecting an original memory space of the application program 1 according to one embodiment of the present invention. As shown in the page table, the memory space of the application program 1 is reduced by 12 k (three pages), and the memory pages of the operating system kernel and other application programs is increased by 12 k (three pages). After the guest operating system collects the memory space released by the garbage collector, the memory space can be assigned and used by the operating system kernel and all the application programs operating thereon.

Described next is the process for the guest operating system requesting the virtual machine hypervisor to assign a memory and release a memory according to an embodiment of the present invention. The guest operating system and the virtual machine hypervisor manage the memory assignment through maintaining a page table. The page table maintained by the virtual machine hypervisor is a corresponding table of the machine address where a plurality of memory pages assigned to a plurality of operating systems locate. Here, for the convenience of description, a physical address to which the machine address corresponds in the guest operating system is added.

Figure 7:
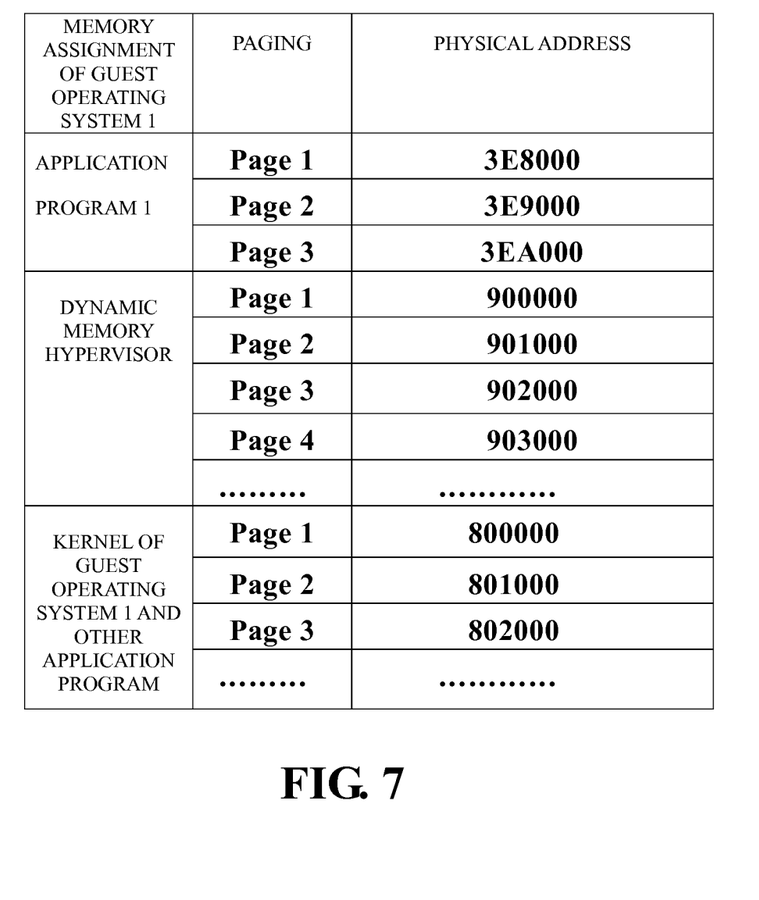
FIG. 7 illustrates a page table that the guest operating system 1 maintains a memory space according to another embodiment of the present invention.

FIG. 7 illustrates a page table that the guest operating system 1 maintains a memory space according to another embodiment of the present invention, wherein the application program 1 occupies a memory of 12 k (three pages), and the dynamic memory space occupies a memory of 16 k (four pages).

Figure 8:
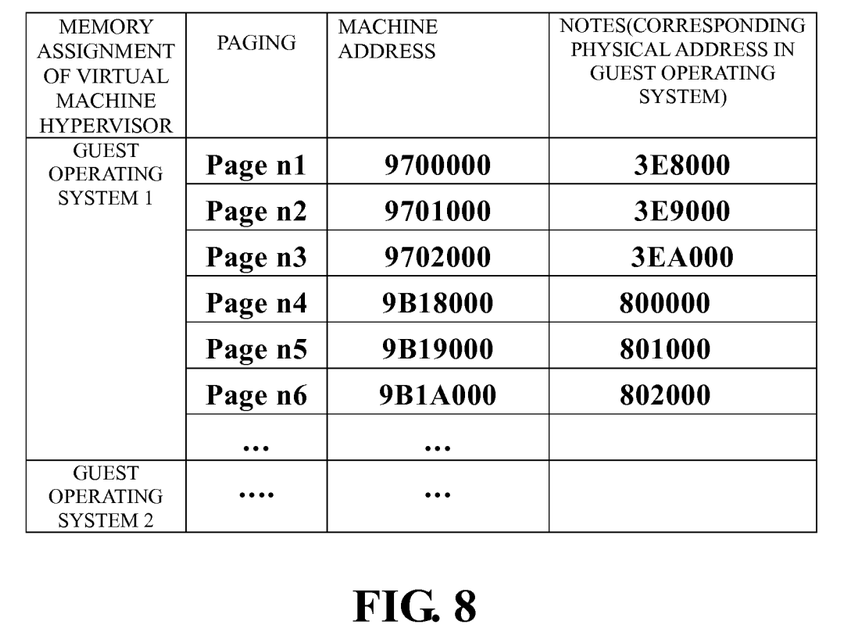
FIG. 8 illustrates a page table that the virtual machine hypervisor maintains a memory space according to another embodiment of the present invention.

FIG. 8 illustrates a page table that the virtual machine hypervisor maintains a memory space according to another embodiment of the present invention. The process that the guest operating system 1 requests the virtual machine hypervisor to assign a memory and release a memory is as follow: the garbage collector issues a system call: gc_dmem_allocate (size), requesting the guest operating system 1 to assign a memory. The guest operating system notifies the dynamic memory hypervisor of releasing a segment of space.

The process that the dynamic memory hypervisor releases memory to the guest operating system 1 is actually a process for requesting the virtual machine hypervisor to assign a memory. It is finished by the dynamic memory hypervisor through a system call hypercall, the hypercall being defined as hcall_mem_allocate (size). After receiving a request, the virtual machine hypervisor checks that the free memory can meet the need, then assigns corresponding memory to the dynamic memory hypervisor, updates the corresponding page table, and returns a sign indicating that the memory assignment is successful.

Figure 9:
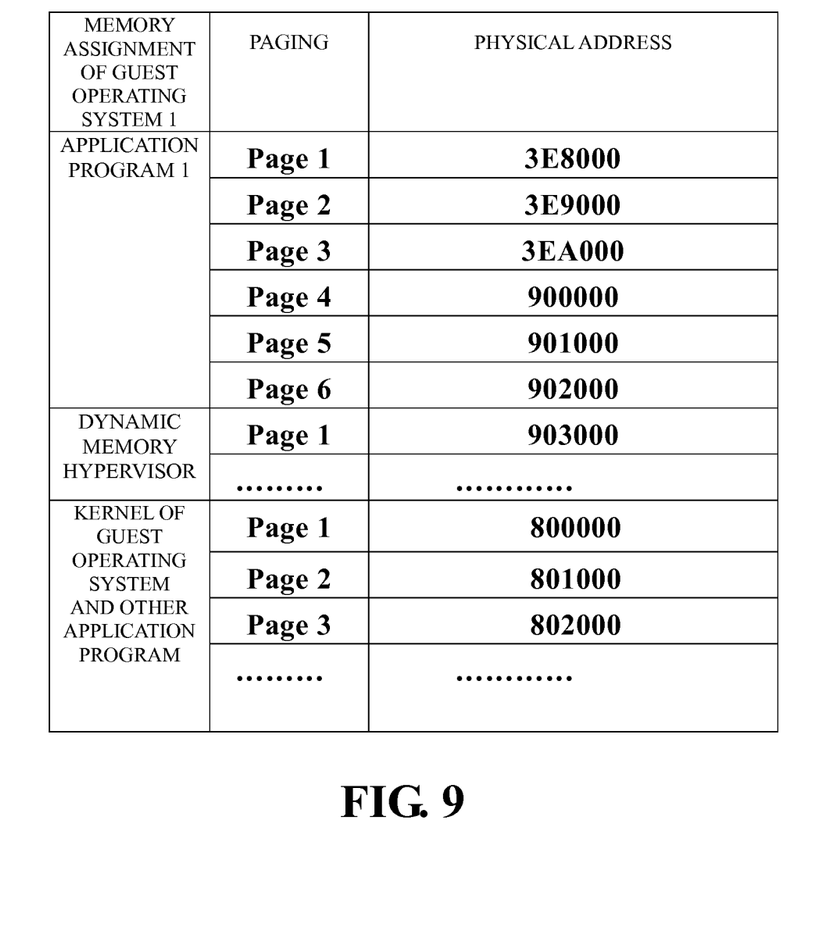
FIG. 9 illustrates an updated page table after the guest operating system 1 assigning a memory space to the application program according to another embodiment of the present invention.

FIG. 9 illustrates an updated page table after the guest operating system 1 assigning a memory space to the application program according to another embodiment of the present invention.

As shown in the page table, the reduced memory space of 12 k of the dynamic memory space is converted into a memory space increased to the application program 1, whereby the memory space maintained by the guest operating system 1 keeps unchanged.

Figure 10:
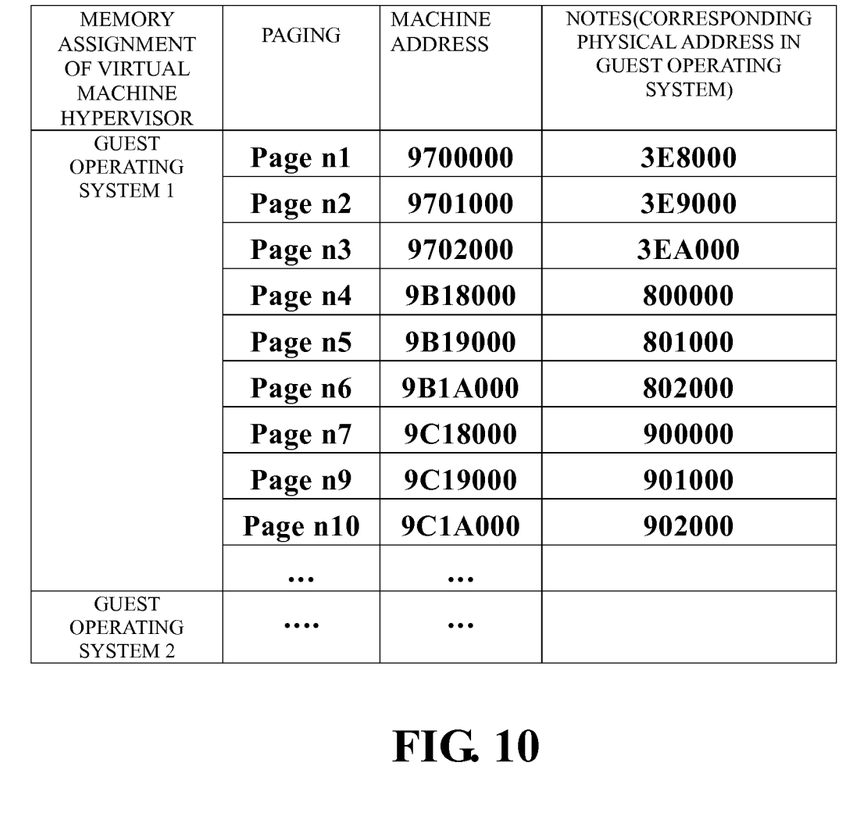
FIG. 10 illustrates an updated page table after the virtual machine hypervisor assigning a memory space to the guest operating system 1 according to another embodiment of the present invention.

FIG. 10 illustrates an updated page table after the virtual machine hypervisor assigning a memory space to the guest operating system 1 according to another embodiment of the present invention. As shown in the page table, the virtual machine hypervisor adds a memory space of 12 k (three pages) to the guest operating system 1. Thereafter, the garbage collector marks live objects in an original memory space of the application program 1 using a Mark-Copy method and replicates the marked live objects to the newly assigned memory space.

Finally, the garbage collector releases the original memory space of the application program 1 to the guest operating system 1: the garbage collector issues a system call of releasing the memory space of the application program 1 to the guest operating system 1: gc_dmem_release (pointer, size), indicating the starting address and the size of the released memory. The guest operating system 1 notifies the dynamic memory hypervisor to collect a space of the application program 1 released by the garbage collection process.

Figure 11:
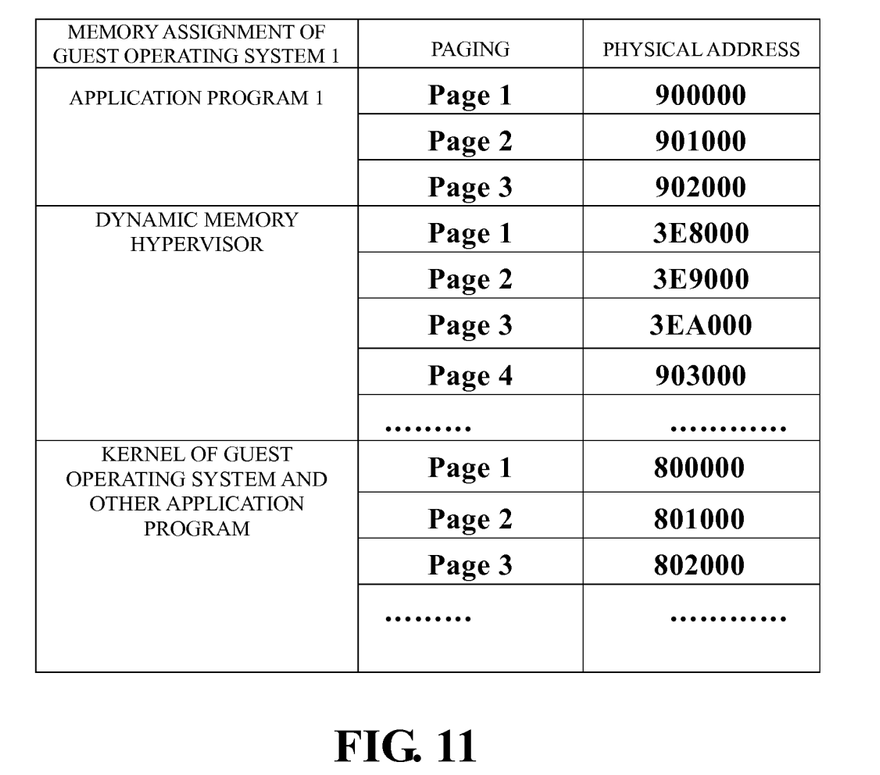
FIG. 11 illustrates an updated page table after the guest operating system 1 collecting an original memory space of an application program 1 according to another embodiment of the present invention.

FIG. 11 illustrates an updated page table after the guest operating system 1 collecting an original memory space of the application program 1 according to another embodiment of the present invention. The dynamic memory hypervisor calls a hypercall to indicate the size and the location of the released memory. The hypercall is defined as hcall_mem_release (pointer, size). The virtual machine hypervisor does not assign an actual physical address for the address pointed from hcall_mem_release( ).

Figure 12:
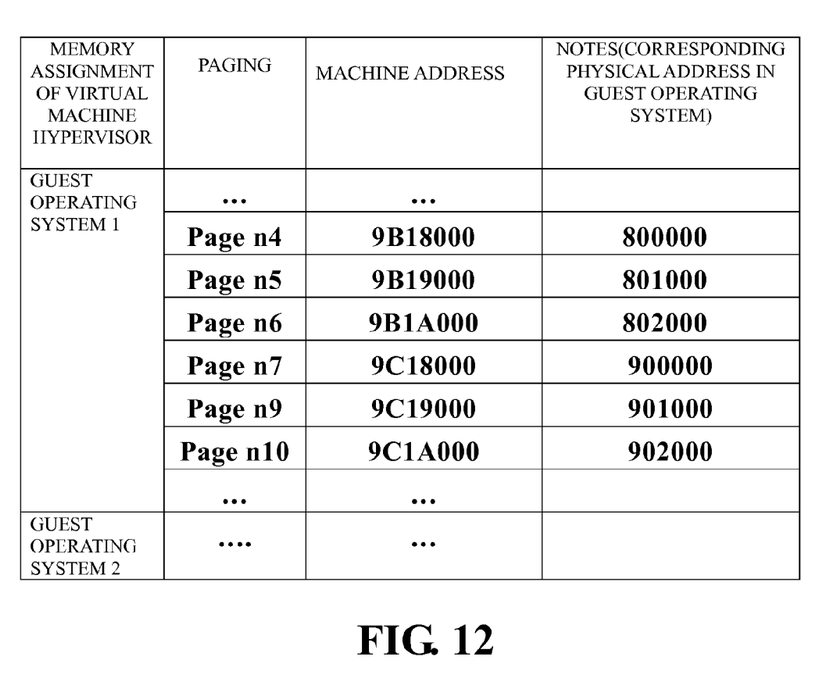
FIG. 12 illustrates an updated page table after the virtual machine hypervisor collecting a memory space of the guest operating system 1 according to another embodiment of the present invention.

FIG. 12 illustrates an updated page table after the virtual machine hypervisor collecting a memory space of the guest operating system 1 according to another embodiment of the present invention. After the virtual machine hypervisor collects the memory space released by the guest operating system, the memory space can be assigned and used by all guest operating systems operating thereon, which greatly improves the usage rate of the memory.

Based on the same inventive concept, the present invention also proposes a system for garbage collection in a virtualization environment.

Figure 13:
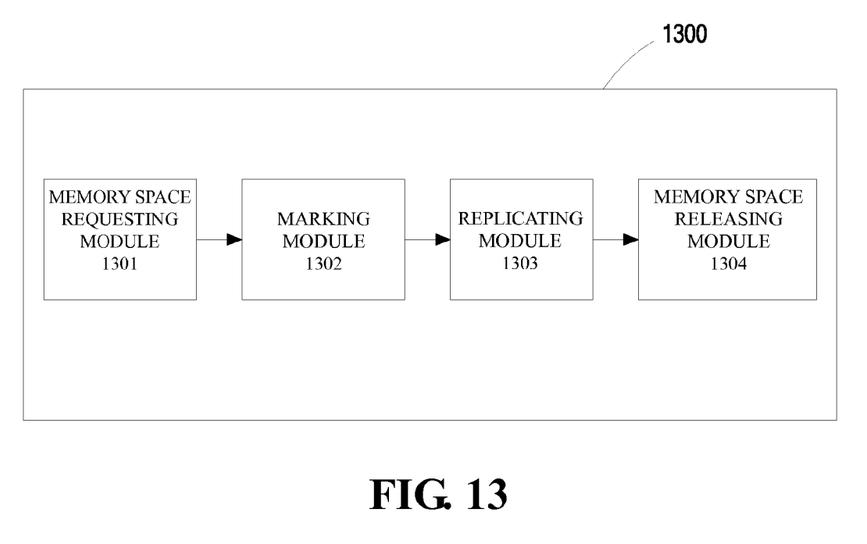
FIG. 13 illustrates a system for garbage collection in a virtualization environment according to an embodiment of the present invention.

FIG. 13 illustrates a system 1300 for garbage collection in a virtualization environment. The virtualization environment 100 includes a virtual machine hypervisor 115, at least one guest operating system 120 and at least one application program 125 that runs on each guest operating system 120, wherein the application program 125 performs memory management using a garbage collection mechanism, the system includes: a memory space requesting module 1301 configured to request the guest operating system 120 to assign a memory space for the application program 125, in response to an operating environment of the application program initiating garbage collection; a marking module 1302 configured to mark live objects in an original memory space of the application program 125, in response to the guest operating system assigning the memory space for the application program; a replicating module 1303 configured to replicate the marked live objects to the assigned memory space; and a memory space releasing module 1304 configured to release the original memory space of the application program to the guest operating system.

The above modules can be realized in the operating environment of the application program as an enhancement of the current garbage collection mechanism.

The guest operating system 120 assigning a memory space for the application program 125 is realized in the following way: the guest operating system 120 determines whether there is enough memory space to be assigned to the garbage collector in response to the received request for assigning a memory space; if the determination result is positive, the guest operating system 120 assigns a memory space for the garbage collector; and if the determination result is negative, the guest operating system 120 issues a request to the virtual machine hypervisor 115 for assigning a memory space.

According to one embodiment of the present invention, the guest operating system 120 issuing a request to the virtual machine hypervisor 115 for assigning the memory space further includes: the dynamic memory hypervisor in the guest operating system calls a request issued to the virtual machine hypervisor for assigning the memory space through a virtual machine kernel function. The memory space releasing module is further configured to issue a system call of releasing the original memory space of the application program to the dynamic memory hypervisor in the guest operating system 120, and to release the original memory space of the application program 125 to the dynamic memory hypervisor. The dynamic memory hypervisor calls a request issued to the virtual machine hypervisor 115 for collecting the original memory space of the application program through a virtual machine kernel function, and releases the original memory space of the application program to the virtual machine hypervisor.

It should be understood that at least some aspects of the present invention can be realized in a form of program products as a replacement. The program for defining the function of the present invention can be transmitted to a data storage medium or a computer system through various signal carrying media. The signal carrying media include but are not limited to non-writable storage medium (such as CD-ROM), writable storage medium (such as soft disk and hard disk driver, R/W CD-ROM and optical medium) and computer including Ethernet and communication medium such as telephone network. Thus, it should be understood that in such signal carrying media, when they are carried and encoded with computer readable instructions that manage the method functions of the present invention, they represent the replaceable embodiments. The present invention can be realized in a form of hardware, software, firmware or the combination thereof. The present invention can be realized in a computer system in an integrated way or in a distributed way.

In the distributed way, different parts are distributed in several interconnected computer systems. Any computer system or other device that is adapted to perform the method described in the present invention is suitable. Preferably, the present invention is implemented in a form of a combination of computer software and common computer hardware. In such implementation, when the computer program is loaded and performed, the computer program controls the computer system to execute the method of the present invention or constitutes the system of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

What is claimed is:

1. A method of garbage collection in a virtualization environment, the virtualization environment comprising a virtual machine hypervisor, a plurality of guest operating systems and a plurality of application programs that runs on the plurality of guest operating systems wherein the plurality of application programs performs memory management using a garbage collection mechanism, the method comprising the steps of:
   requesting at least one guest operating system of the plurality of guest operating systems to assign a memory space for at least one application program of the plurality of application programs in response to an operating environment of the at least one application program initiating garbage collection, wherein the at least one guest operating system performs assignment of memory space to the at least one application program based on maintenance of page tables of the plurality of guest operating systems, and wherein the page tables are physical address locations of the virtualization environment at which a plurality of memory spaces of the assigned memory space are located;
   marking live objects in an original memory space of the at least one application program in response to the at least one guest operating system assigning the memory space for the at least one application program;
   replicating the marked live objects to the assigned memory space;
   releasing the original memory space of the at least one application program to the at least one guest operating system;
   determining, by the at least one guest operating system, whether there is enough memory space to be assigned to the at least one application program;
   assigning the memory space for the at least one application program if the determination result is positive;
   issuing a request by the at least one guest operating system to the virtual machine hypervisor for assigning the memory space if the determination result is negative;
   obtaining the memory space assigned by the virtual machine hypervisor; and
   assigning the memory space assigned by the virtual machine hypervisor to the at least one application program;
   calling, by a dynamic memory hypervisor in the at least one guest operating system, the request issued to the virtual machine hypervisor for assigning the memory space through a virtual machine kernel function.

2. The method according to claim 1, wherein releasing the original memory space of the at least one guest operating system to the at least one guest operating system comprises:
   issuing a system call of releasing the original memory space of the at least one application program to the dynamic memory hypervisor in the at least one guest operating system, and
   releasing the original memory space of the at least one guest operating system to the dynamic memory hypervisor.

3. The method according to claim 2, wherein the dynamic memory hypervisor calls the request issued to the virtual machine hypervisor for collecting the original memory space of the at least one application program through the virtual machine kernel function, and releases the original memory space of the at least one application program to the virtual machine hypervisor.

4. The system for garbage collection in a virtualization environment, the virtualization environment comprising a virtual machine hypervisor, a plurality of guest operating systems and a plurality of application programs that runs on the plurality of guest operating systems wherein the plurality of application programs performs memory management using a garbage collection mechanism, the system comprising:
   a memory space requesting module configured to request at least one guest operating system of the plurality of guest operating systems to assign a memory space for at least one application program of the plurality of application programs, in response to an operating environment of the at least one application program initiating garbage collection, wherein the at least one guest operating system performs assignment of memory space to the at least one application program based on maintenance of page tables of the plurality of guest operating systems, and wherein the page tables are physical address locations of the virtualization environment at which a plurality of memory spaces of the assigned memory space are located;

a marking module configured to mark live objects in an original memory space of the at least one application program, in response to the at least one guest operating system assigning the memory space for the at least one application program;

a replicating module configured to replicate the marked live objects to the assigned memory space; and a memory space releasing module configured to release the original memory space of the at least one application program to the at least one guest operating system;

the at least one guest operating system determining whether there is enough memory space to be assigned to the;

if the determination result is positive, the at least one guest operating system assigns the memory space for the application program;

if the determination result is negative, the at least one guest operating system issues a request to the virtual machine hypervisor for assigning the memory space;

the at least one guest operating system obtains the memory space assigned by the virtual machine hypervisor; and the at least one guest operating system assigns the memory space assigned by the virtual machine hypervisor to the at least one application program; and the dynamic memory hypervisor in the at least one guest operating system calls the request issued to the virtual machine hypervisor for assigning the memory space through a virtual machine kernel function.

5. The system according to claim 4, wherein the memory space releasing module is further configured to:

issue a system call of releasing the original memory space of the at least one application program to the dynamic memory hypervisor in the at least one guest operating system, and release the original memory space of the at least one application program to the dynamic memory hypervisor.

6. The system according to claim 5, wherein the dynamic memory hypervisor calls a request issued to the virtual machine hypervisor for collecting the original memory space of the at least one application program through a virtual machine kernel function, and releases the original memory space of the at least one application program to the virtual machine hypervisor.

7. An storage medium tangibly embodying computer readable instructions which, when implemented, cause a computer to carry out the steps of a method of garbage collection in a virtualization environment, the virtualization environment comprising a virtual machine hypervisor, a plurality of guest operating systems and a plurality of application programs that runs on the plurality of guest operating systems wherein the plurality of application programs performs memory management using a garbage collection mechanism, according to claim 1.

* * * * *